United States Patent
Takahashi (10) Patent No.: US 8,441,483 B2
(45) Date of Patent: May 14, 2013

(54) IMAGE GENERATING DEVICE, IMAGE GENERATING METHOD, INFORMATION RECORDING MEDIUM, AND PROGRAM

(75) Inventor: Kiyokazu Takahashi, Tokyo (JP)

(73) Assignee: Konami Digital Entertainment Co., Ltd., Tokyo (JP)

(*) Notice: Subject to any disclaimer, the term of this patent is extended or adjusted under 35 U.S.C. 154(b) by 611 days.

(21) Appl. No.: 12/674,417

(22) PCT Filed: Aug. 20, 2008

(86) PCT No.: PCT/JP2008/064809
§ 371 (c)(1),
(2), (4) Date: Feb. 19, 2010

(87) PCT Pub. No.: WO2009/025288
PCT Pub. Date: Feb. 26, 2009

(65) Prior Publication Data
US 2011/0227918 A1 Sep. 22, 2011

(30) Foreign Application Priority Data
Aug. 21, 2007 (JP) ................................. 2007-214317

(51) Int. Cl.
*G06T 15/506* (2006.01)
*G06T 19/00* (2011.01)
(52) U.S. Cl.
USPC .......................................... 345/426; 345/419
(58) Field of Classification Search ........................ None
See application file for complete search history.

(56) References Cited

FOREIGN PATENT DOCUMENTS

| JP | 140723 | 5/2002 |
|---|---|---|
| JP | 122479 | 5/2005 |
| JP | 128687 | 5/2005 |
| JP | 2006-259818 A | 9/2006 |

OTHER PUBLICATIONS

Machine translation of JP, 2005-122479.*
Machine translation of JP, 2006-259818.*
Email_Correspondence_Examiner_Applicant_12674417.*
HowardBH-#2237507-v1-Ashida_(127)_Proposed_Examiner_s_Amendment.*
Supplementary European Search Report for Application No. EP 08827803 mailed Aug. 10, 2010, 5 pages.
Wang Jing et al., "A Post-processing Decal Texture Mapping Algorithm on Graphics Hardware", RCIA proceedings Jun. 14-16, 2006, 6 pages.

* cited by examiner

*Primary Examiner* — Kee M Tung
*Assistant Examiner* — Sing-Wai Wu
(74) *Attorney, Agent, or Firm* — Howard & Howard Attorneys PLLC (57) ABSTRACT

A bullet-mark information memory unit (250) stores bullet hole information containing a normal map defining a recess of a bullet hole. An original image drawing unit (261) draws an original image containing an object having undergone lighting. A synthesizing unit (262) synthesizes a bullet hole to which a normal map is applied with a hit location of the drawn object. A compensation value calculating unit (263) calculates a compensation value based on a relationship between a normal line of the object and a light source direction. A brightness value calculating unit (264) calculates a brightness value based on a relationship between a normal line direction of a bullet through a normal map and a light source direction, and a relationship with the calculated compensation value. A shading unit (265) uses the calculated brightness value and performs shading which changes a tone of the object at a synthesis position.

8 Claims, 8 Drawing Sheets

IMAGE GENERATING DEVICE, IMAGE GENERATING METHOD, INFORMATION RECORDING MEDIUM, AND PROGRAM

TECHNICAL FIELD

The present invention relates to an image generating device, an image generating method, an information recording medium and a program which can display a trace added in an image without appearing awkward by using a simple structure.

BACKGROUND ART

Recently, in some video game devices, sensory video games, such as an action game and a sport game, have become popular. According to such action games or sport games, changes in scenery coinciding with the progress of such a game are displayed in real time in order to enhance a realistic sensation and reality.

For example, in an action game where characters that are divided into friend and foe shoot guns at each other, bullet holes formed on a wall or the like are displayed instantaneously. Moreover, in a sport game that allows a player to manipulate a character on a snowboard, a snowboard track (trace) is displayed in real time on the snow where the snowboard has moved.

An example is a sports game that displays a snowboard track having a three-dimensional image processing device, which is video game device technology, that preliminarily stores textures (i.e., a deep snowboard track, a shallow snowboard track etc.) for snowboard tracks; and, selects and pastes an appropriate texture in accordance with the snow quality of a snowboard trail, thereby drawing a trace realistically and easily (see, for example, patent literature 1).

Patent Literature 1: Unexamined Japanese Patent Application KOKAI Publication No. 2002-140723 (P. 6 to P. 10, FIG. 8).

DISCLOSURE OF INVENTION

Problem to be Solved by the Present Invention

Like the foregoing snowboarding game that displays snowboard tracks, action games that display bullet holes, preliminarily prepare textures for bullet holes and an appropriate texture is later selected and pasted depending on the kind of hit.

However, as a background scene, or the like, of a game becomes more realistic, the number of bullet hole textures to be prepared increases and a large amount of the memory capacity needed for drawing nears depletion. That is, a large number of textures broken up in accordance with not only the kind (material or the like) of a wall but also the color of the wall and the pattern thereof become necessary, and, since the memory is near depletion, the remaining memory capacity is not enough to support the textures.

Accordingly, in current practice, since the number of bullet hole textures is limited in some measures, an awkward bullet hole is often displayed. For example, on a concrete wall, when only a few kinds of bullet hole textures are prepared beforehand, an unnatural bullet hole, that does not match the hit on the concrete wall, is displayed at an extremely high rate in a game which draws concrete walls with diverse colors and patterns.

Therefore, a new technology which can display a bullet hole or the like without appearing awkward and without consuming a large amount of memory capacity is desired.

The present invention has been made in order to overcome the foregoing problem, and it is an object of the present invention to provide an image generating device, an image generating method, an information recording medium and a program which can display a trace added in an image without appearing awkward by using a simple structure.

Means for Solving the Problem

An image generating device according to the first aspect of the present invention generates an image in which a predetermined object (e.g., a wall) arranged in a three-dimensional virtual space is synthesized with a concave or convex trace (e.g., a bullet hole), and comprises an information memory unit, an original image drawing unit, a synthesizing unit, a brightness value calculating unit and a shading unit.

First, the information memory unit stores trace information containing a normal map for a trace. The original image drawing unit draws an original image containing an object (e.g., a wall having undergone a light source calculation) arranged in the virtual space. The synthesis unit synthesizes the drawn object with the trace to which a normal map is applied. For example, a wall having undergone a light source calculation is used as a texture, and a normal map is applied to this texture to synthesize a bullet hole.

The brightness value calculating unit calculates a brightness value based on the relationship between the synthesis position of an object's normal line, which is where the trace is synthesized, and a light source direction; and, a relationship between a normal line of the synthesized trace through a normal map and a light source direction. The shading unit performs shading on an image of the object at a synthesis position based on the calculated brightness value. For example, an image (texture) of a wall with which a bullet hole is synthesized is subjected to shading based on the calculated brightness value.

Note that since a normal map is applied to an object (a wall or the like having undergone a light source calculation) in an original image, if the normal map application remains as is, the lighting becomes unnatural and appears awkward (e.g., a concavity/convexity does not match a shade).

Accordingly, shading on an image of the object at the synthesis position based on the calculated brightness value appropriately compensates the lighting for the trace, which avoids an awkward appearance. Moreover, by using an object (e.g., a wall having undergone a light source calculation) in an original image and by compensating an image at the synthesis position, a process of starting over a light source calculation becomes unnecessary.

As a result, it becomes possible to display a trace added in an image without appearing awkward by using a simple structure.

An image generating device according to the second aspect of the present invention generates an image in which a predetermined object (e.g., a wall), which is arranged in a three-dimensional space, is synthesized with a bullet hole. The image generating device according to the second aspect of the present invention comprises an information memory unit, an original image drawing unit, a synthesizing unit, a compensation value calculating unit, a brightness value calculating unit and a shading unit.

First, the information memory unit stores bullet hole information containing a normal map defining a recess of the bullet hole. The original image drawing unit draws an original image containing the object having undergone lighting, which means that the original image has undergone a light source calculation using an arranged light source. The synthesizing unit synthesizes the bullet hole, to which the normal map is applied, at a predetermined portion of the drawn object. For example, a wall having undergone a light source calculation is used as a texture, and a normal map is applied to this texture to synthesize a bullet hole.

The compensation value calculating unit calculates a compensation value based on a relationship between a normal line of the object at a synthesis position where the bullet hole is synthesized and a light source direction. The brightness value calculating unit calculates a brightness value based on a relationship between a normal line of the bullet hole, synthesized with the object through the normal map, a light source direction, and the calculated compensation value. The shading unit applies shading that changes a tone of the object at the synthesis position using the calculated brightness value. For example, suppose an image (texture) of a wall is synthesized with a bullet hole, a tone thereof would be changed using the calculated brightness value.

Note that since a normal map is applied to an object (a wall or the like having undergone a light source calculation) in an original image, if it remains unchanged, the lighting becomes unnatural, and the image appears awkward (e.g., there may be a portion which hollows but has no shade).

Accordingly, by applying shading that changes a tone of an object at a synthesis position based on the calculated brightness value, the lighting for the bullet hole is appropriately compensated to eliminate an awkward appearance. Moreover, by using an object (e.g., a wall having undergone a light source calculation) in an original image and by compensating a tone of an image at the synthesis position, a process of starting over a light source calculation becomes unnecessary.

As a result, it becomes possible to display a trace added in an image without appearing awkward by using a simple structure.

The compensation value calculating unit may acquire an inner product of a normal line of the object and a light source direction, and may calculate a compensation value based on a relationship between the inner product and a predetermined defined value. For example, an inner product of a normal line of a wall to be synthesized with a trace (e.g., a bullet hole) and a light source direction is acquired, and either larger one of the inner product and 0.0 is subtracted from 1.0, resulting in a compensation value.

The brightness value calculating unit may acquire an inner product of a normal line of the bullet hole through the normal map and a light source direction, and may add the inner product or a predetermined defined value, whichever is larger, to a compensation value calculated by the compensation value calculating unit to calculate a brightness value; and, the shading unit may multiply a value of a color of the object by the calculated brightness value at least one time to perform shading which changes a tone of the object.

For example, the brightness value calculating unit acquires an inner product of a normal line direction of a synthesized bullet hole and a light source direction, and adds either larger one of the inner product and a negative compensation value to a compensation value calculated by the compensation value calculating unit to calculate a brightness value. The shading unit multiplies the calculated brightness value by either smaller one of the brightness value and 1.0 together to perform shading.

The information memory unit may further store information on a texture color of the bullet hole, and the shading unit may multiply a value of a color of the object by the brightness value, and then multiply the texture color of the bullet hole by at least a predetermined synthesis coefficient to change a tone of the object in order to emphasize the bullet hole. In this case, a dark portion or the like is emphasized, so that the bullet hole becomes more noticeable.

An image generating method according to the third aspect of the present invention is carried out by an image generating device which has a memory unit, a drawing unit and a computation unit. The image generating device generates an image in which a predetermined object arranged in a three-dimensional virtual space is synthesized with a convex or concave trace, and comprises an original image drawing step, a synthesis step, a brightness value calculating step and a shading step.

First, in the original image drawing step, the drawing unit draws an original image containing the object (e.g., a wall having undergone a light source calculation) arranged in the virtual space. In the synthesis step, the drawn object is synthesized with the trace to which the normal map is applied. For example, a wall having undergone a light source calculation is used as a texture, and a normal map is applied to this texture to synthesize a bullet hole.

In the brightness value calculating step, a brightness value is calculated based on a relationship between a normal line of the object at a synthesis position where the trace is synthesized and a light source direction, and a relationship between a normal line of the synthesized trace through a normal map and a light source direction. In the shading step, an image of the object at the synthesis position is subjected to shading based on the calculated brightness value. For example, an image (texture) of a wall to be synthesized with a bullet hole is subjected to shading based on the calculated brightness value.

Note that since a normal map is applied to an object (a wall or the like having undergone a light source calculation) in an original image, if it remains unchanged, the lighting becomes unnatural, and the image appears awkward (e.g., a concavity/convexity does not match a shade).

Accordingly, by applying shading on an image of the object at the synthesis position based on the calculated brightness value, the lighting for the trace is appropriately compensated to eliminate an awkward appearance. Moreover, by using an object (e.g., a wall having undergone a light source calculation) in an original image and by compensating an image at the synthesis position, a process of starting over a light source calculation becomes unnecessary.

As a result, it becomes possible to display a trace added in an image without appearing awkward by using a simple structure.

An information recording medium according to the fourth aspect of the present invention stores a program that allows a computer (including electronic devices) to function as the foregoing image generating device.

A program according to the fifth aspect of the present invention allows a computer (including electronic devices) to function as the foregoing image generating device.

The program can be recorded in a computer-readable information recording medium, such as a compact disk, a flexible disk, a hard disk drive, a magneto-optical disk, a digital video disk, a magnetic tape, or a semiconductor memory.

The program can be distributed and sold via a computer communication network independently from a computer which executes the program. Moreover, the foregoing information recording medium can be distributed and sold independently from the computer.

Effect of the Invention

According to the present invention, it is possible to display a trace added in an image without appearing awkward by using a simple structure.

BRIEF DESCRIPTION OF DRAWINGS

FIG. 5A is an exemplary diagram showing an image of a wall synthesized with a bullet hole having undergone brightness adjustment or the like;

DESCRIPTION OF REFERENCE NUMERALS

100 Game device
101 CPU
102 ROM
103 RAM
104 Interface
105 Controller
106 External memory
107 DVD-ROM drive
108 Image processing unit
109 Sound processing unit
110 NIC
200 Image generating device
210 Object information memory unit
220 Light-source information memory unit
230 Operation unit
240 Position managing unit
250 Bullet-mark information memory unit
260 Image drawing unit

BEST MODE FOR CARRYING OUT THE INVENTION

Embodiments of the present invention will be described below. For ease of understanding, the embodiments below of the present invention are described as applications to game devices. However, the present invention may be similarly applied to information processing devices, such as various computers, PDAs, and mobile phones. In other words, the embodiments described below are provided to give an explanation, not to limit the scope of the present invention. Therefore, those skilled in the art can adopt embodiments in which some or all of the elements herein have been replaced with respective equivalents, and such embodiments are also included within the scope of the present invention.

[First Embodiment]

Figure 1:
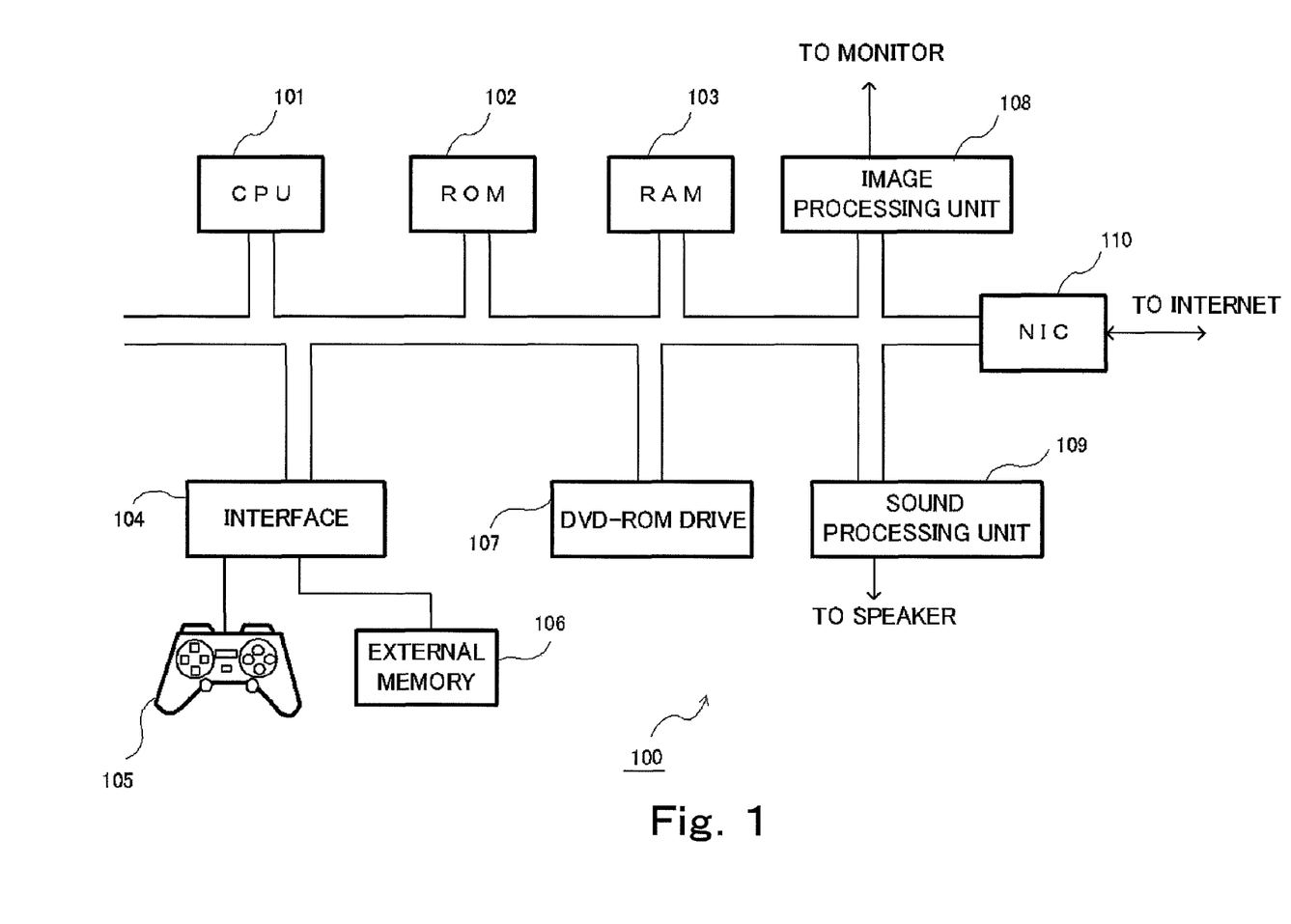
FIG. 1 is an exemplary diagram showing a schematic configuration of a game device according to an embodiment of the present invention.

FIG. 1 is an exemplary diagram showing a schematic configuration of a typical game device by which an image generating device according to an embodiment of the present invention is realized. The following explanation will be given with reference to FIG. 1.

A game device 100 includes a Central Processing Unit (CPU) 101, a Read Only Memory (ROM) 102, a Random Access Memory (RAM) 103, an interface 104, a controller 105, an external memory 106, a Digital Versatile Disk (DVD)-ROM drive 107, an image processing unit 108, a sound processing unit 109, and a Network Interface Card (NIC) 110.

When a DVD-ROM that stores a game program and data is inserted to the DVD-ROM drive 107 and the game device 100 is turned on, the program is executed and the image generating device according to the present embodiment is realized.

The CPU 101 controls the operation of the whole game device 100, and is connected to each component to exchange control signals and data with it.

An Initial Program Loader (IPL), which is executed immediately after the power is turned on, is stored in the ROM 102, and when executed, makes a program stored on the DVD-ROM be read into the RAM 103 and executed by the CPU 101. Further, an operating system program and various data that are necessary for controlling the operation of the whole game device 100 are stored in the ROM 102.

The RAM 103 is a temporary memory for data and programs, and retains a program and data read out from the DVD-ROM and data necessary for game progressing and chat communications.

The controller 105 connected via the interface 104 receives an operation input given by a user for playing a game. For example, the controller 105 receives input of a letter string (a message) in accordance with the operation input.

The external memory 106 detachably connected via the interface 104 stores data representing the progress status of a game, log (record) data of chat communications, etc. As needed, a user can record such data into the external memory 106 by entering an instruction input via the controller unit 105.

A DVD-ROM to be loaded in the DVD-ROM drive 107 stores a program for realizing a game and image data and sound data that accompany the game. Under the control of the CPU 101, the DVD-ROM drive 107 performs a reading process to the DVD-ROM loaded therein to read out a necessary program and data, which are to be temporarily stored in the RAM 103, etc.

The image processing unit 108 processes data read from a DVD-ROM by means of the CPU 101 and an image calculation processor (not shown) possessed by the image processing unit 108, and records the processed data in a frame memory (not shown) possessed by the image processing unit 108. Image information recorded in the frame memory is converted to video signals at predetermined synchronization timings and displayed on a monitor (not shown) connected to the image processing unit 108. This enables various types of image display.

The image calculation processor can perform, at a high speed, overlay calculation of two-dimensional images, transparency calculation such as a blending, etc., and various saturation calculations.

The image calculation processor can also execute a high-speed calculation of polygon display information that is within a virtual three-dimensional space and affixed with various texture information by Z buffering and obtaining a rendered image of the polygon disposed in the virtual three-dimensional space as seen panoramically from a predetermined view position.

Furthermore, the CPU 101 and the image calculation processor can operate in conjunction to depict a string of letters as a two-dimensional image in the frame memory or on each polygon surface in accordance with font information that defines the shape of the letters. The font information is stored in the ROM 102, but dedicated font information stored in a DVD-ROM may be used.

The sound processing unit 109 converts sound data read out from a DVD-ROM into an analog sound signal and outputs such sound signal from a speaker (not shown) connected thereto. Under the control of the CPU 101, the sound processing unit 109 generates a sound effect or music data that is released during the progress of a game, and outputs a sound corresponding to the data from the speaker.

The NIC 110 connects the game device 100 to a computer communication network (not shown) such as the Internet, etc. The NIC 110 includes a 10BASE-T/100BASE-T product used for building a Local Area Network (LAN), an analog modem, an Integrated Services Digital Network (ISDN) modem, or an Asymmetric Digital Subscriber Line (ADSL) modem for connecting to the Internet via a telephone line, a cable modem for connecting to the Internet via a cable television line, or the like, and an interface (not shown) that intermediates between any of these and the CPU 101.

The game device 100 may use a large capacity external storage device such as a hard disk or the like and configure it to serve the same function as the ROM 102, the RAM 103, the external memory 106, a DVD-ROM loaded in the DVD-ROM drive 107, or the like.

It is also possible to employ an embodiment in which a keyboard for receiving an input for editing a letter string from a user, a mouse for receiving a position designation or a selection input of various kinds from a user, etc. are connected.

An ordinary computer (general-purpose personal computer or the like) may be used as the image generating device instead of the game device 100 according to the present embodiment. For example, like the game device 100 described above, an ordinary computer may include a CPU a RAM, a ROM, a DVD-ROM drive, and an NIC, an image processing unit with simpler capabilities than those of the game device 100, and a hard disk drive as its external storage device with also compatibility with a flexible disk, a magneto-optical disk, a magnetic tape, etc. Such a computer uses a keyboard, a mouse, etc. instead of a controller as its input device. When a game program is installed on the computer and executed, the computer functions as the image generating device.

[Schematic Configuration of Image Generating Device]

Figure 2:
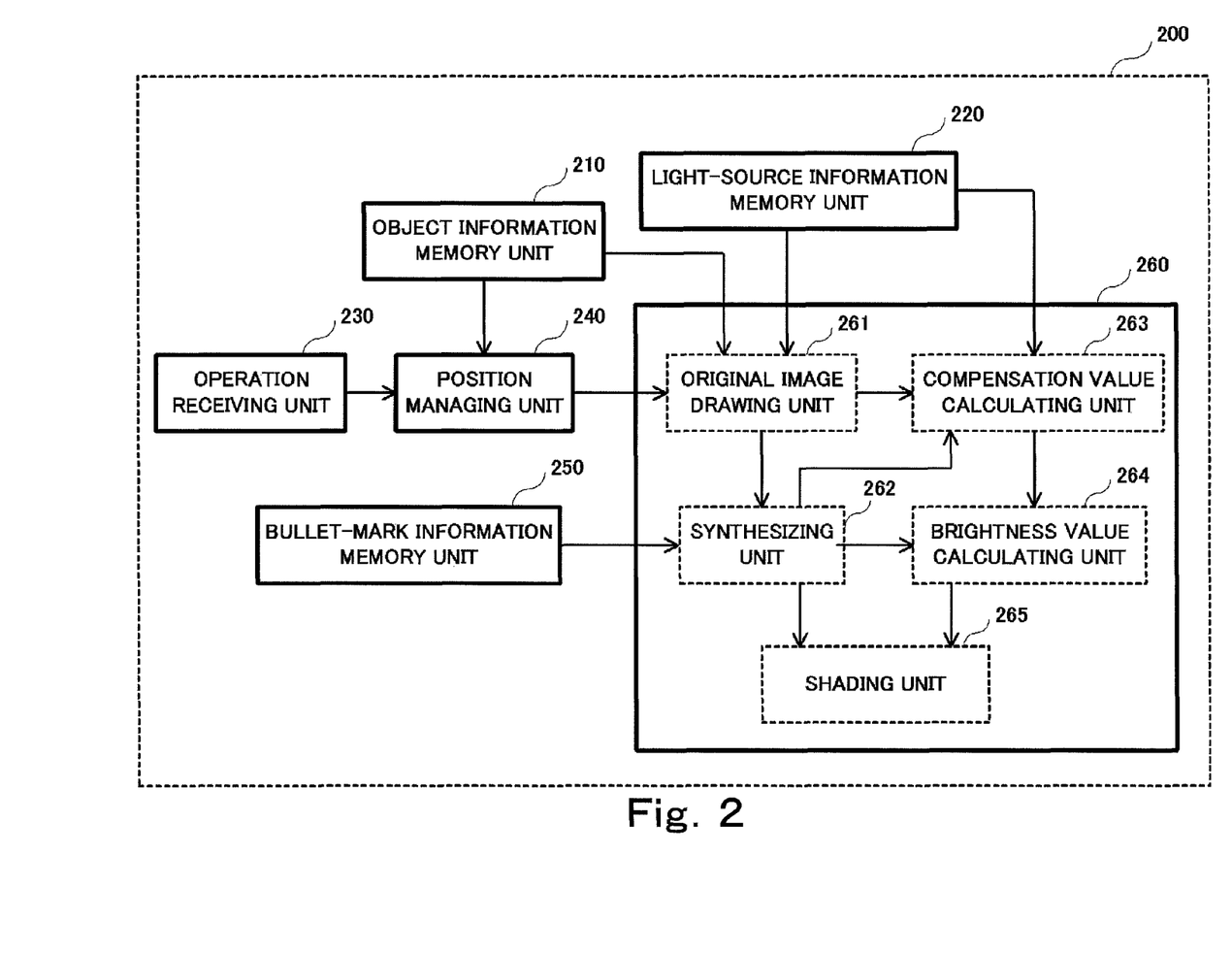
FIG. 2 is an exemplary diagram showing a schematic configuration of an image generating device according to the embodiment of the present invention.

FIG. 2 is an exemplary diagram showing a schematic configuration of an image generating device of the embodiment. The image generating device generates a realistic image, such as, for example, a bullet hole in an action game where players that are divided into friend and foe shoot at each other with guns. An explanation will be given with reference to this figure.

As shown in the figure, an image generating device 200 has an object information memory unit 210, a light-source information memory unit 220, an operation receiving unit 230, a position managing unit 240, a bullet-hole information memory unit 250, and an image drawing unit 260.

First of all, the object information memory unit 210 stores information on objects, such as a character, a tree and a building positioned in a virtual space.

For example, the object information memory unit 210 stores information on primitives (polygons or the like) that configure individual characters, such as a player character, a friend character and an enemy character, and information on a texture or the like to be pasted on the surface of a primitive.

The object information memory unit 210 also stores information on primitives configuring each object of a building or the like, such as a wall, a window or a wall, and information on a texture or the like.

Note that the RAM 103 or the like functions as such object information memory unit 210.

The light-source information memory unit 220 stores information on a light source arranged in the virtual space. For example, the light-source information memory unit 220 may store information, such as, for example, a type of light source (a point light source, a parallel light source, a spot light or the like), a position of a light source (an arranged position, an illumination range, an illumination direction, an intensity and an attenuation or the like), and a color of a light source (a diffuse color, an ambient color, a specular color or the like).

Note that the RAM 103 or the like functions as light-source information memory unit 220.

The operation receiving unit 230 receives an operation input , such as, for example, a movement instruction or the like to a character operated by a player himself/herself. For example, when any type of action button (e.g., direction keys, an A button, a B button, an X button, a Y button, etc. arranged on the controller 105) that corresponds to a movement, (e.g., movement in a predetermined direction, sticking to a wall, getting down, or hitting the dirt, etc.) is pressed by the player, the operation receiving unit 230 receives an operation input for player character. Note that the controller 105 functions as such operation receiving unit 230.

The position managing unit 240 manages position information (a current position, a direction, and the like) of an object, such as the player character or an enemy character changing its position in the virtual space. For example, the player character changes its position and direction in the virtual space in accordance with a movement instruction or the like received through the operation receiving unit 230, so that the position information of the player character is managed by the position managing unit 240. Moreover, an enemy character also moves appropriately in accordance with a predetermined logic, and changes its position or the like in the virtual space, so that the position managing unit 240 also manages the position information of an enemy character.

In addition, the position managing unit 240 manages an impact position or the like of an object when a character or the like shoots a gun and an object, such as, for example, a building is hit.

Note that the RAM 103 and the CPU 101 function as such position managing unit 240.

The bullet-mark information memory unit 250 stores bullet hole information, containing a normal map for defining a recess of a bullet hole formed on a building or the like.

The normal map is a special texture for realizing a bump mapping, a value of a normal line is stored in each texel, and a pseudo concavity/convexity is expressed on a synthesized (mapped) polygon. Note that a recess of a bullet hole is defined by a normal line of a local coordinate system. When an object is synthesized with a bullet hole, the bullet hole is converted into a world coordinate system, and a recessed bullet hole is expressed on an object.

For example, the bullet-mark information memory unit 250 stores information on a texture (texture for a black color or a gray color), an alpha channel (alpha value), and a normal map, for each bullet hole.

Figure 3A:
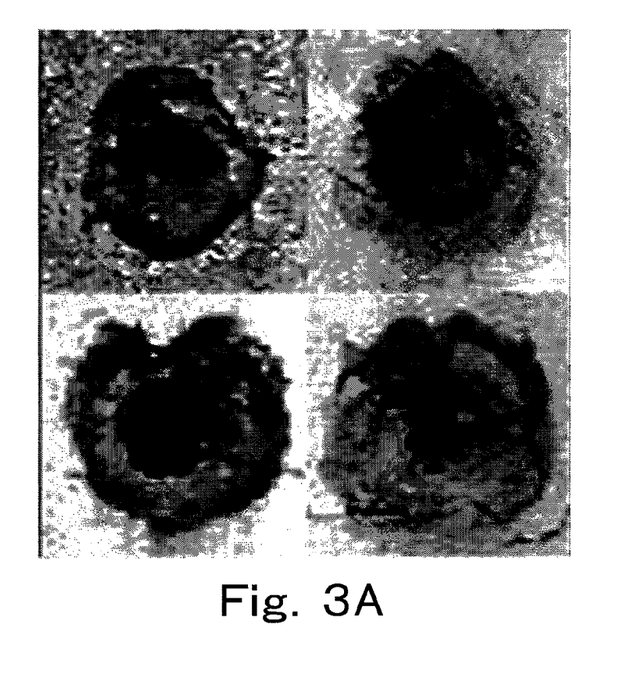
FIG. 3A is an exemplary diagram showing a texture of a bullet hole.
Figure 3B:
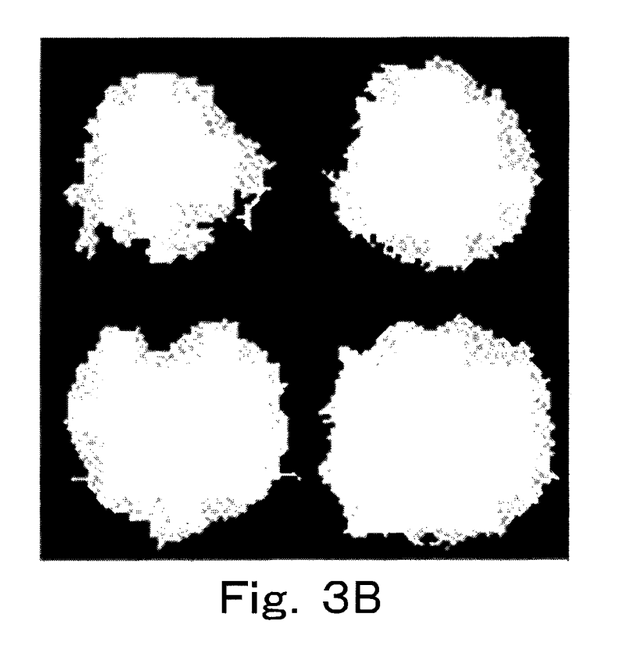
FIG. 3B is an exemplary diagram showing an alpha channel of a bullet hole.
Figure 3C:
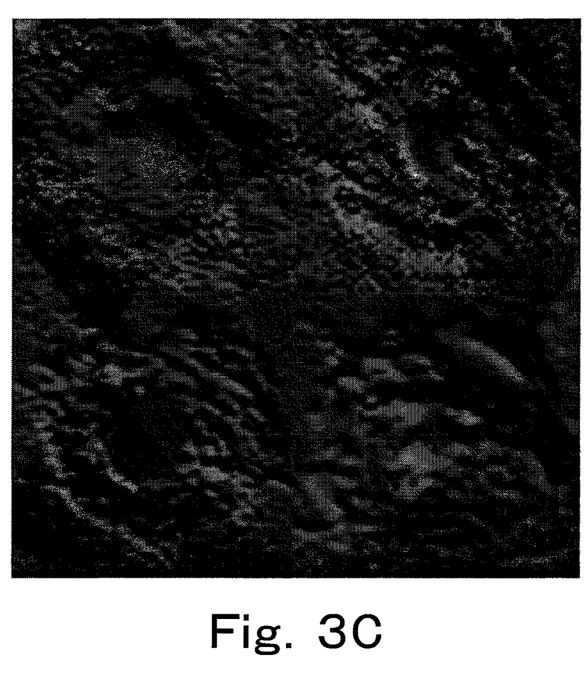
FIG. 3C is an exemplary diagram showing a normal map of a bullet hole.

More specifically, the bullet-mark information memory unit 250 stores a texture shown in FIG. 3A, an alpha channel shown in FIG. 3B, and a normal map shown in FIG. 3C.

Note that the RAM 103 and the CPU 101 function as such bullet-mark information memory unit 250.

The image drawing unit 260 draws a display image in which an object in the virtual space (range of vision) is converted into a view point coordinate in accordance with information on the object stored in the object memory unit 210 and position information on a character managed by the position managing unit 240, and the like.

More specifically, the image drawing unit 260 comprises an original image drawing unit 261, a synthesizing unit 262, a compensation value calculating unit 263, a brightness value calculating unit 264 and a shading unit 265.

First, the original image drawing unit 261 draws an original image containing an object having undergone lighting. That is, the original image drawing unit 261 applies light source information in the light-source information memory unit 220 to an object arranged in the virtual space, and draws an original image having undergone light source computation.

Figure 4A:
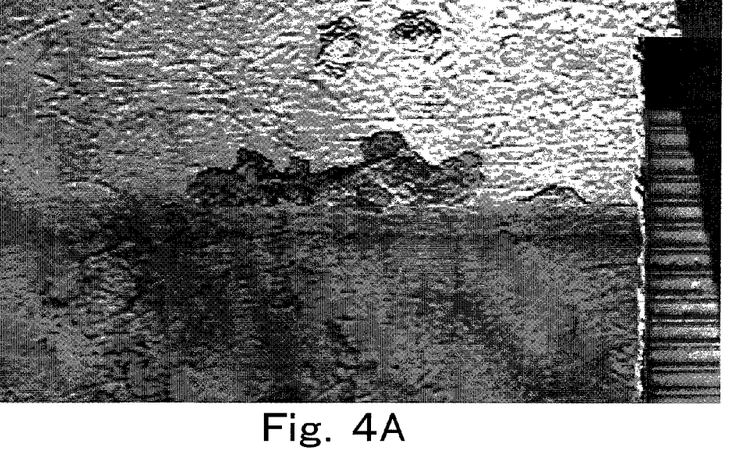
FIG. 4A is an exemplary diagram showing an image of a wall.

For example, when an object including a wall of a building is arranged in the range of vision, a wall shown in FIG. 4A is drawn as an original image. Note that the original image shown in FIG. 4A is subjected to lighting, so that the image appears realistic.

Returning to FIG. 2, the synthesizing unit 262 synthesizes a bullet hole at a hit location when the hit location of an object is managed.

Figure 4B:
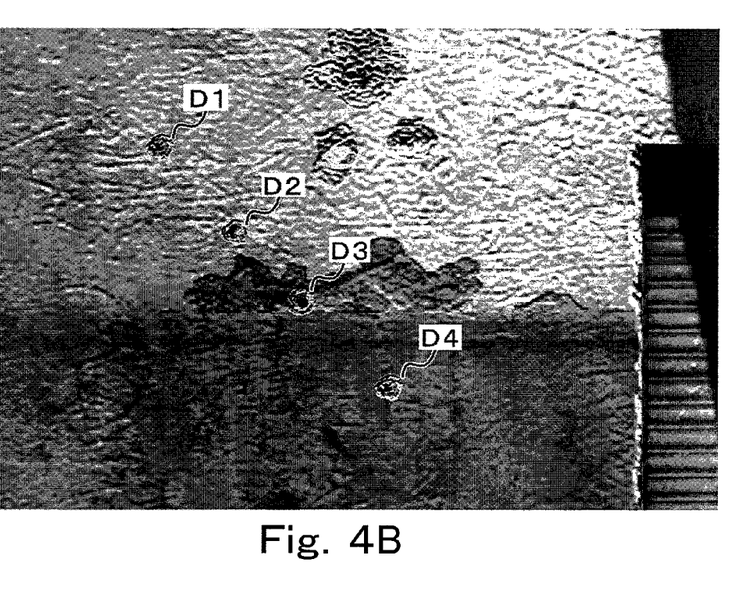
FIG. 4B is an exemplary diagram showing an image of a wall synthesized with a bullet hole texture.

For example, when four bullets hit the wall (object) shown in FIG. 4A, the synthesizing unit 262 uses images of hit locations as textures, and applies a bullet hole normal map to each texture, thereby synthesizing bullet holes D1 to D4 shown in FIG. 4B.

Note that regarding the image shown in FIG. 4B, the wall itself look realistic, but the bullet holes D1 to D4 have unnatural lighting for recesses and do not match the surrounding wall since the images of hit locations are directly used as textures making the bullet holes appear awkward.

Returning to FIG. 2, the compensation value calculating unit 263 calculates a value for compensation for a synthesized bullet hole. That is, the compensation value calculating unit 263 acquires an inner product of the normal line of a hit object and a light source direction, and calculates a compensation value based on a relationship between the acquired inner product and a predetermined defined value. More specifically, the compensation value calculating unit 263 calculates a compensation value based on following equation 1.

$$\text{rate1} = 1.0 - \max(0.0, \text{dot}(\text{wall\_normal}, -\text{light\_dir})) \quad [\text{Equation 1}]$$

where:
rate1 is a compensation value;
max is a function for acquiring a maximum value;
dot is a function for acquiring an inner product;
wall_normal is a normal direction of an object; and
light_dir is a light source direction (one which is normalized)

That is, the compensation value calculating unit 263 acquires an inner product of a normal line direction of an object and a light source direction, and subtracts the inner product or [0.0], whichever is larger, from [1.0].

Note that the aforementioned equation 1 is merely an example, and can be appropriately changed and modified in accordance with an image actually drawn. For example, [1.0], [0.0] or the like in equation 1 is not limited to such a value, and can be increased or decreased appropriately.

The brightness value calculating unit 264 calculates a brightness of a bullet hole based on the foregoing compensation value or the like. That is, the brightness value calculating unit 264 acquires an inner product of a normal line direction of a bullet hole through a normal map and a light source direction. The inner product or a predetermined defined value, whichever is larger, is added to the compensation value calculated by the compensation value calculating unit 263, thereby calculating a brightness value. More specifically, the brightness value calculating unit 264 calculates a compensation value based on following equation 2.

$$\text{rate2} = \max(-\text{rate1}, \text{dot}(\text{pixel\_normal}, -\text{light\_dir})) + \text{rate1} \quad [\text{Equation 2}]$$

where:
rate2 is a brightness value;
max is a function for acquiring a maximum value;
rate1 is a compensation value;
dot is a function for acquiring an inner product;
pixel_normal is a normal line direction of a normal map (one which is converted into a word coordinate system); and
light_dir is a light source direction (one which is normalized)

That is, the brightness value calculating unit 264 acquires an inner product of a normal line direction of a normal map and a light source direction, and adds the inner product or a negative compensation value, whichever is larger, to a compensation value.

Note that foregoing equation 2 is merely an example, and can be changed and modified in accordance with an image actually drawn.

The shading unit 265 applies shading which changes a tone of an object at a hit location (more specifically, a tone of a color) using the calculated brightness value.

More specifically, the shading unit 265 performs shading based on following equation 3.

$$\text{result} = \text{screen\_color} * \text{rate2} * \min(\text{rate2}, 1.0) \quad [\text{Equation 3}]$$

where:
result is a shading result;
screen_color is a color of an object (a color of a screen currently drawn);
rate2 is a brightness value; and
min is a function for acquiring a minimum value.

That is, the shading unit 265 multiplies a color of an object (a color of a screen currently drawn), the brightness and the smaller of either the brightness value or [1.0], thereby applying shading together. The reason why the smaller of either the brightness or [1.0] is multiplied is to darken a dark position more and to clarify a concavity/convexity.

Note that foregoing equation 3 is merely an example, and can be changed and modified in accordance with an image actually drawn. For example, [1.0] or the like in equation 3 is not limited to such a value, and can be increased or decreased appropriately.

Figure 5A:
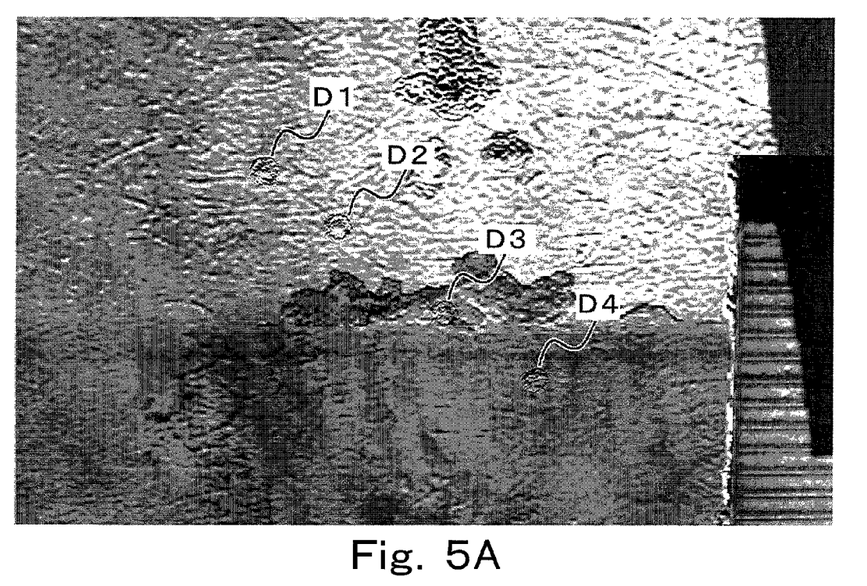

The shading unit 265 which performs a process like equation 3 performs shading on a bullet hole D1 to D4 shown in FIG. 4B, thereby adjusting the image of a bullet hole D1 to D4 to the image of a bullet hole D1 to D4 shown in FIG. 5A.

Regarding the image shown in FIG. 5A, a lighting or the like of a recess for a bullet hole D1 to D4 is compensated, so that a bullet hole D1 to D4 matches the surrounding wall without appearing awkward.

Note that the shading unit 265 may execute a texture synthesis coefficient multiplication process or the like in order to further emphasizing a bullet hole.

More specifically, the shading unit 265 further applies shading based on following equation 4.

$$result2 = result*((tex\_color*\text{texture synthesis coefficient}) + (1.0 - \text{texture synthesis coefficient})) \quad [\text{Equation 4}]$$

where:
result2 is a shading result for emphasizing a bullet hole;
result is a shading result of equation 3;
tex_color is a color of a bullet hole texture; and
texture synthesis coefficient is, as an example, 0.3

That is, the shading unit 265 multiplies a value acquired by adding a value obtained by multiplying a color of a bullet hole texture and a texture synthesis coefficient (e.g., 0.3), and a value obtained by subtracting a texture synthesis coefficient from [1.0], by a shading result from equation 3, thereby performing shading.

Note that foregoing equation 4 is merely an example, and can be changed and modified appropriately. For example, [1.0] or the like in equation 4 is not limited to such a value, and can be increased or decreased appropriately.

Figure 5B:
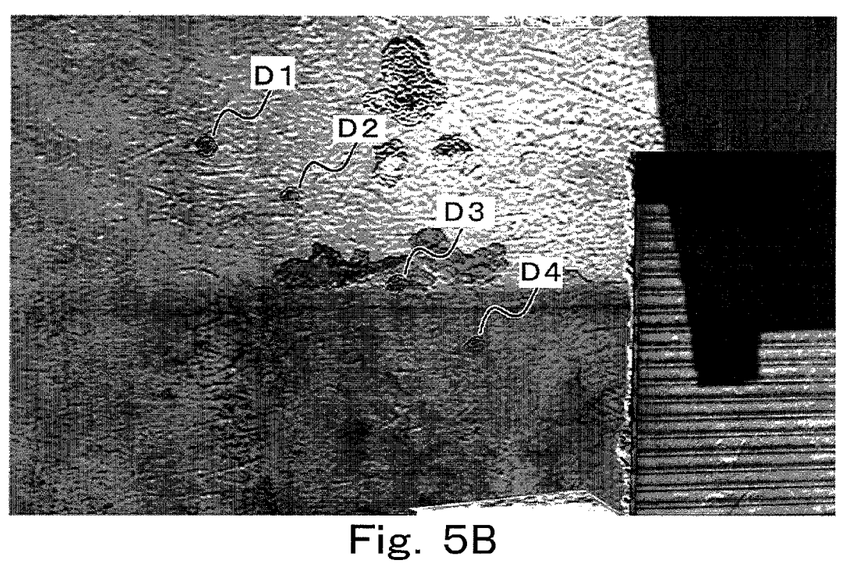
FIG. 5B is an exemplary diagram showing an image of a wall synthesized with a bullet hole having undergone emphasizing.

The shading unit 265 which further executes the foregoing process based on equation 4 adjusts an image of a bullet hole D1 to D4 shown in FIG. 5A to an image of a bullet hole D1 to D4 shown in FIG. 5B, and emphasizes each bullet hole.

The image shown in FIG. 5B naturally matches a peripheral wall, and has emphasized dark portions and the like, so that the bullet hole becomes significantly noticeable.

As explained above, when an image is drawn, the image drawing unit 260 uses an original image as a texture while the image undergoes lighting and applies a normal map of a bullet hole to this texture when illustrating a bullet impact.

At this time, since a texture to be used is a texture having already undergone lighting (a texture after a light source calculation is carried out), if a regular normal map calculation is carried out, lighting becomes unnatural and appears awkward (e.g., there may be a portion which hollows but has no shade). Accordingly, the image drawing unit 260 executes calculation based on foregoing equations 1 to 4 to avoid appearing awkward when displaying the shading.

Moreover, by using a texture having undergone lighting and by compensating such a texture, recalculation of a light source becomes unnecessary.

The image processing unit 108 functions as such image drawing unit 260.

[Operation of Image Generating Device]

Figure 6:
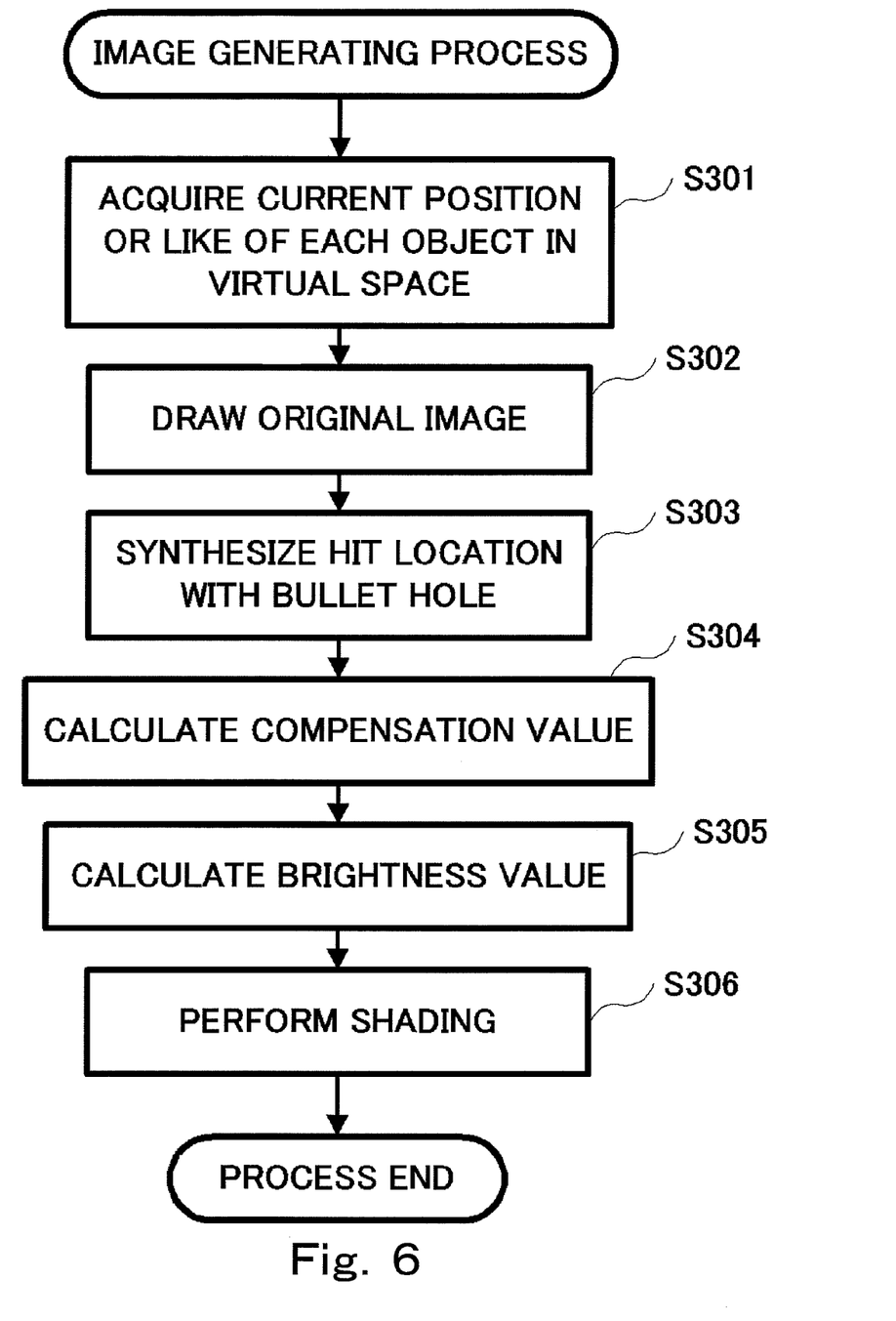
FIG. 6 is a flowchart showing an example of an image generating process according to the embodiment of the present invention.

FIG. 6 is a flowchart showing the flow of an image generating process executed by the image generating device 200 having the foregoing structure. An explanation will be given of the operation of the image generating device 200 with reference to this flowchart. The image generating device is repeatedly executed for each drawing cycle (e.g., for each ⅟60 second) in a game.

First, the image generating device 200 acquires a current position or the like of each object in the virtual space (step S301). That is, the image generating device 200 acquires object information on a character or a building based on information stored in (managed by) the object information memory unit 210 and the position managing unit 240.

The image generating device 200 draws an original image (step S302).

That is, the original image drawing unit 261 specifies an object arranged in the range of vision from the acquired object information, applies light source information in the light-source information memory unit 220 to the specified object, thereby drawing an original image having undergone lighting.

The image generating device 200 synthesizes a bullet hole with a hit location (step S303). That is, when a hit location of an object is found, the synthesizing unit 262 synthesizes a bullet hole with that hit location.

More specifically, using an image of a hit location as a texture, by applying a normal map of a bullet hole to that texture, and the synthesizing unit 262 synthesizes a bullet hole D1 to D4 shown in FIG. 4B. Note that the image shown in FIG. 4B has a reality for the wall itself, but regarding a bullet hole D1 to D4, an image of a hit location is directly used as a texture, lighting or the like for a recess is unnatural, and the bullet hole does not match the surrounding wall, resulting in an awkward bullet hole image.

The image generating device 200 calculates a compensation value (step S304).

That is, the compensation value calculating unit 263 acquires an inner product of a normal line of a hit object and a light source direction, and calculates a compensation value based on a relationship between the inner product and the predetermined defined value. More specifically, the compensation value calculating unit 263 calculates a compensation value based on foregoing equation 1.

The image generating device 200 calculates a brightness value (step S305).

That is, the brightness value calculating unit 264 acquires an inner product of a normal line direction of a bullet through a normal map and a light source direction, adds the larger of the inner product or the predetermined defined value to the compensation value calculated by the compensation value calculating unit 263, thereby calculating a brightness value. More specifically, the brightness value calculating unit 264 calculates a brightness value based on foregoing equation 2.

The image generating device 200 performs shading (step S306).

That is, the shading unit 265 multiplies a color of an object (a color of a screen currently drawn), the brightness value, and either smaller one of the brightness value and [1.0] together, thereby performing shading. More specifically, the shading unit 265 performs shading based on foregoing equation 3.

The image generating device 200 may further perform a process of multiplying a texture synthesis coefficient in order to emphasize a bullet hole. More specifically, shading based on foregoing equation 2 may be further carried out.

More specifically, the shading unit 265 executes a process based on equation 3 to adjust an image of a bullet hole to an image of a bullet hole D1 to D4. Regarding a bullet hole D1 to D4, the image shown in FIG. 5A has a recess having undergone lighting compensation, and the bullet hole matches the surrounding wall, without appearing awkward.

Moreover, the shading unit 265 executes a process based on equation 4 to adjust an image of a bullet hole to an image of a bullet hole D1 to D4 shown in FIG. 5B. The image shown in FIG. 5B has a bullet hole D1 to D4 matching the surrounding wall, and a dark portion is emphasized so that the bullet hole becomes significantly noticeable.

Through the foregoing image generating process, when an original image is drawn, it an original image is used as a texture while having undergoing lighting, and a normal map of a bullet hole is applied to this texture to express a bullet impact.

At this time, since a texture to be used is a texture having already undergone lighting, if a general normal map calculation is carried out, the lighting becomes unnatural and the image appears awkward (e.g., there may be a portion which hollows but has no shade). Accordingly, by performing calculation through equation 1 to equation 4, shading can be carried out without appearing awkward.

Moreover, by using a texture having undergone lighting and by compensating such a texture, a process of starting over a light source calculation becomes unnecessary.

As a result, it becomes possible to display a trace added in an image without appearing awkward by using a simple structure.

[Another Embodiment]

Although the explanation has been given of the case where a bullet hole hit on a wall or the like is expressed in the foregoing embodiment, the present invention can be appropriately applied to a case other than a concave shape like a bullet hole.

For example, the present invention can be applied to a case where a convex trace or the like is synthesized.

Figure 7A:
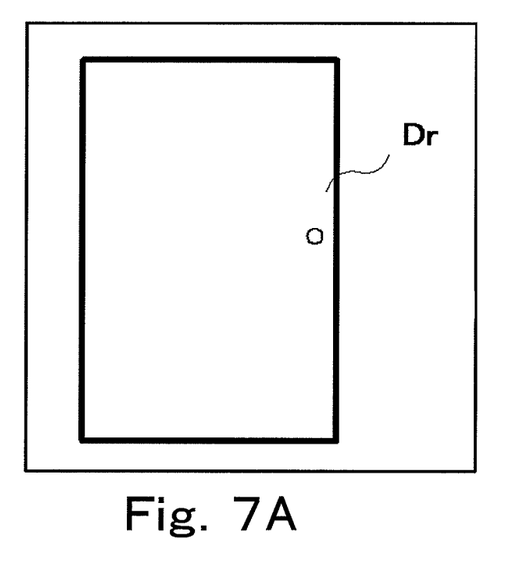
FIG. 7A is an exemplary diagram for explaining a case where another trace is added.

As an example, as shown in FIG. 7A, if a player character is facing an enemy character across a metallic door Dr, a bullet shot by the enemy character may hit the rear face (a face toward the enemy character) of the door Dr. In this case, as viewed from the front face of the door Dr, a hit portion convexly expands. Accordingly, it is necessary to display a convex trace K shown in FIG. 7B on the front face of the door Dr.

Figure 7B:
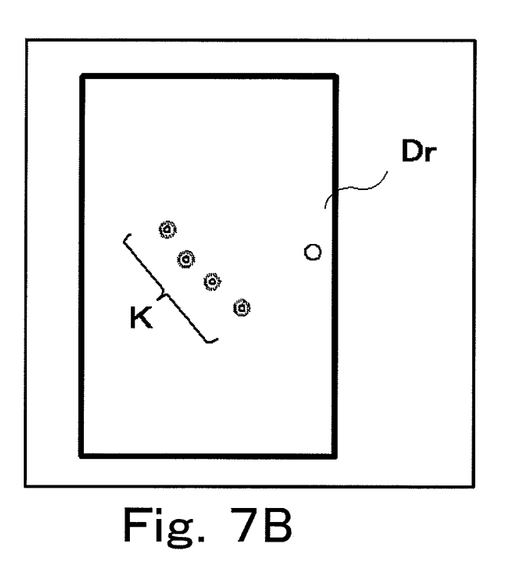
FIG. 7B is an exemplary diagram for explaining a case where another trace is added.

At this time, like the foregoing process, a trace at a bullet impact is expressed by applying a normal map (in this case, convex shape).

In this case, the image drawing unit 260 uses, as a texture, an original image (an image of the metallic door Dr) at a state where such an image is drawn while undergoing lighting, and applies a normal map of a trace to this texture to express a bullet impact.

Since a texture to be used is a texture having already undergone lighting, if a general normal map calculation is carried out, the lighting becomes unnatural and appears awkward (e.g., there may be a portion which protrudes but has a shade). Accordingly, by appropriately performing calculation based on foregoing equations 1 to 4, shading can be carried out without appearing awkward.

Moreover, by using a texture having undergone lighting and by compensating such a texture, recalculating a light source becomes unnecessary.

As a result, it becomes possible to display a trace added in an image without appearing awkward by using a simple structure.

As explained above, according to the present invention, it becomes possible to display a trace added in an image without appearing awkward by using a simple structure.

The present application claims a priority based on Japanese Patent Application No. 2007-214317, the contents of which is incorporated herein by reference in its entirety.

Industrial Applicability

As explained above, according to the present invention, an image generating device, an image generating method, an information recording medium and a program is provided that can display a trace added in an image without appealing awkward by using a simple structure.

The invention claimed is:

1. An image generating device that generates an image in which a predetermined object arranged in a three-dimensional virtual space is synthesized with a concave or convex trace, comprising:
   an information memory unit that stores trace information containing a normal map for the trace;
   an original image drawing unit that draws an original image containing the predetermined object arranged in the virtual space;
   a synthesizing unit that synthesizes the drawn object with the trace to which the normal map is applied;
   a brightness value calculating unit that calculates a brightness value as a function of a first factor and a second factor, the first factor being a function of a relationship between a normal line of the image at a synthesis position where the drawn object is synthesized and a light source direction, the second factor being a function of a relationship between a normal line of the drawn object, synthesized with the image, through the normal map and the light source direction; and
   a shading unit that performs shading on an image of the object at the synthesis position based on the calculated brightness value wherein the shading is performed on the drawn object, but not the rest of the image.

2. An image generating device that generates an image in which a predetermined object arranged in a three-dimensional virtual space is synthesized with a bullet hole, comprising:
   an information memory unit that stores bullet hole information containing a normal map defining a recess of the bullet hole;
   an original image drawing unit that draws an original image containing the object having undergone lighting;
   a synthesizing unit that synthesizes the bullet hole, to which the normal map is applied, at a predetermined portion of the drawn object;
   a compensation value calculating unit that calculates a compensation value based on a relationship between a normal line of the object at a synthesis position where the bullet hole is synthesized and a light source direction;
   a brightness value calculating unit that calculates a brightness value based on a relationship between a normal line of the bullet hole, synthesized with the object, through the normal map and a light source direction, and the calculated compensation value; and
   a shading unit that performs shading which changes a tone of the object at the synthesis position using the calculated brightness value wherein the shading is performed at the synthesis position on the bullet hole but not the rest of the object.

3. The image generating device according to claim 2, wherein the compensation value calculating unit acquires an inner product of a normal line of the object and a light source direction, and calculates a compensation value based on a relationship between the inner product and a predetermined defined value.

4. The image generating device according to claim 2, wherein
   the brightness value calculating unit acquires an inner product of a normal line of the bullet hole through the normal map and a light source direction, and adds the larger of either the inner product or a predetermined defined value to a compensation value calculated by the compensation value calculating unit to calculate a brightness value, and the shading unit multiplies a value of a color of the object by the calculated brightness value at least one time to perform shading which changes a tone of the object.

5. The image generating device according to claim 4, wherein the information memory unit further stores information on a texture color of the bullet hole, and the shading unit multiplies a value of a color of the object by the brightness value, and then multiplies the texture color of the bullet hole by at least a predetermined synthesis coefficient to change a tone of the object in order to emphasize the bullet hole.

6. An image generating method by an image generating device which has a memory unit, a drawing unit and a computation unit and which generates an image in which a predetermined object arranged in a three-dimensional virtual space is synthesized with a convex or concave trace, the memory unit storing trace information containing a normal map for the trace, the method comprising:

an original image drawing step in which the drawing unit draws an original image containing the predetermined object arranged in the virtual space;

a synthesis step in which the drawing unit synthesizes the drawn object with the trace to which the normal map is applied;

a brightness value calculating step in which the computation unit calculates a brightness value as a function of a first factor and a second factor, the first factor being a function of a relationship between a normal line of the image at a synthesis position where the drawn object is synthesized and a light source direction, the second factor being a function of a relationship between a normal line of the drawn object, synthesized with the image, through the normal map and the light source direction; and a shading step in which the drawing unit performs shading on an image of the object at the synthesis position based on the calculated brightness value wherein the shading is performed on the drawn object, but not the rest of the image.

7. A non-transitory information recording medium storing a program that allows a computer, which generates an image in which a predetermined object arranged in a three-dimensional virtual space is synthesized with a concave or convex trace, to function as:

an information memory unit that stores trace information containing a normal map for the trace;

an original image drawing unit that draws an original image containing the predetermined object arranged in the virtual space;

a synthesizing unit that synthesizes the drawn object with the trace to which the normal map is applied;

a brightness value calculating unit that calculates a brightness value as a function of a first factor and a second factor, the first factor being a function of a relationship between a normal line of the image at a synthesis position where the drawn object is synthesized and a light source direction, the second factor being a function of a relationship between a normal line of the drawn object, synthesized with the image, through the normal map and the light source direction; and a shading unit that performs shading on an image of the object at the synthesis position based on the calculated brightness value wherein the shading is performed on the drawn object, but not the rest of the image.

8. A program stored on a non-transitory information recording medium that allows a computer, which generates an image in which a predetermined object arranged in a three-dimensional virtual space is synthesized with a concave or convex trace, to function as:

an information memory unit that stores trace information containing a normal map for the trace;

an original image drawing unit that draws an original image containing the predetermined object arranged in the virtual space;

a synthesizing unit that synthesizes the drawn object with the trace to which the normal map is applied;

a brightness value calculating unit that calculates a brightness value as a function of a first factor and a second factor, the first factor being a function of a relationship between a normal line of the image at a synthesis position where the drawn object is and a light source direction, the second factor being a function of a relationship between a normal line of the drawn object, synthesized with the image, through the normal map and the light source direction; and a shading unit that performs shading on an image of the object at the synthesis position based on the calculated brightness value wherein the shading is performed on the drawn object, but not the rest of the image.

* * * * *